United States Patent [19]

Weber et al.

[11] Patent Number: 4,854,404
[45] Date of Patent: Aug. 8, 1989

[54] BUCKET AUGER

[76] Inventors: David R. Weber; Russell L. Weber, both of 10822 Sageyork, Houston, Tex. 77089

[21] Appl. No.: 279,764

[22] Filed: Dec. 5, 1988

[51] Int. Cl.$^4$ .......................... E21B 10/40; A01B 33/06
[52] U.S. Cl. ...................................... 175/327; 175/391; 172/111
[58] Field of Search ............... 175/316, 327, 385, 391; 37/2 R; 172/111

[56] References Cited

U.S. PATENT DOCUMENTS

| 146,475 | 1/1874 | Richards | 175/316 |
| 154,962 | 9/1874 | Salyer | 175/316 |
| 173,482 | 2/1876 | Lyon | 175/316 |
| 185,638 | 12/1876 | Hubbard | 175/316 |
| 244,819 | 7/1881 | Needham | 175/316 |
| 1,916,688 | 7/1933 | Smith | 175/316 |
| 2,091,779 | 8/1937 | Gooder | 175/98 |
| 2,873,950 | 2/1959 | Kandle | 175/385 |
| 3,561,540 | 2/1971 | Kaszkurewicz | 172/111 |

FOREIGN PATENT DOCUMENTS 1163055 9/1969 United Kingdom ................ 175/316

*Primary Examiner*—Dennis L. Taylor
*Assistant Examiner*—Arlen L. Olsen
*Attorney, Agent, or Firm*—Kenneth H. Johnson

[57] ABSTRACT

A bucket auger for excavating holes for planting trees is disclosed which includes a trapezoidal cutting frame having teeth secured to the side and bottom. A central vertical shaft adapted to connect to a rotational drive mechanism is secured through upper and lower members of the frame. Two half frusto conical bucket members are pivotally suspended from the upper cross member of the cutting frame by arms such that the weight of the bucket members plus the weight of earth contained within force the bucket to remain closed during lifting of the bucket auger out of the excavation. Lifting flanges are provided for attaching lifting/opening cables to force the two bucket members open to release the earth contained therein.

17 Claims, 2 Drawing Sheets

BUCKET AUGER

BACKGROUND OF THE INVENTION

1. Field of the Invention

In landscaping operations large grown trees are often transplanted to open areas to provide a pleasing appearance. The trees to be transplanted include a ball of earth about the essential root structure of the tree to be transplanted. The size of the ball depends on both the size of the tree and the size of the necessary root structure for survival of the type of tree. According to the size and type of tree the ball may be as large as four or five feet in diameter.

2. Related Art

In order to successfully plant such a tree a hole must be excavated to accommodate the ball of earth contained about the root structure. Excavations have been performed by hand using shovels or by use of a back hoe. While use of a back hoe may reduce the time necessary to make the hole, due to its digging action a much larger hole is often excavated than required for a ball. Additionally the shape of the hole is such that it may leave an unsightly scar in the landscaped area requiring some hand work to clean up the eyesore.

A need for a device that would quickly and neatly excavate a ball hole was thus seen. While combination auger and buckets are fairly old in the art none appear to be readily adapted for the purpose. For example Lyon in U.S. Pat. No. 173,482 discloses a boring cylinder divided into two parts with cutting edges only on the bottom. The rotational cutting force must be supplied through the walls of the cylinder. Additionally Lyon's auger cylinder requires a band to keep the two halves together during operation which might prove difficult to remove after the auger is lifted from the excavation. Hubbard in U.S. Pat. No. 185,638 discloses a similar earth auger having the similar characteristics to Lyon. Salyer in U.S. Pat. No. 154,962 discloses another version of an earth auger which includes cutting edges on the walls of the cylinder as well as bottom. Salyer's auger depends upon external tabs or lips bearing on the sides of the cylinder to prevent the halves from opening.

Richards in U.S. Pat. No. 146,475 discloses a clamlike auger for cleaning out wells which includes a sliding rotating member for opening a part of the shell to dump the excavation product. The cutting edge in Richard is also contained on the walls of the auger. Similar auger cylinders are disclosed by Needham in U.S. Pat. No. 244,819 and Gooder in U.S. Pat. No. 2,091,779. While each of the disclosed devices may perform their function well, due to the diameter of the excavation required for a tree root ball (often five feet or larger), the strength required in the cutting edge and their support is considerable. Such strength would require a heavy walled cylinder making the weight of the device practically unmanageable without expensive heavy equipment. Additionally the cylindrical shape of these devices would require a deeper excavation than necessary for a tree root ball.

SUMMARY OF THE INVENTION

The auger bucket of the present invention comprises a vertical shaft having the upper end adapted to fit into a rotational mechanism and the lower end tapered into a point. The load bearing cutting frame comprises upper and lower cross members connected by side members in substantially a trapezoidal shape with cutting teeth secured to the side and bottom cross members. The vertical shaft passes through the upper and lower cross members and is securely attached to impart rotational motion to the frame.

Two bucket members, one secured to each side of the upper cross member, are suspended in pivotal relation to the upper cross member by arms which provide a lever arm. The lever arm directs the force of the weight of the two bucket members such that the sides and lower ends are forced together. Thus no retaining means are required to keep the two halves together.

Each of the bucket members is in the shape of a onehalf frusto cone which conforms to the inner edge of the trapezoidal frame, but leaving the cutting teeth exposed. Slots may be provided in the bucket members o allow the excavated earth to enter the bucket, otherwise the force of rotation and cutting action will force them apart to allow entry. The weight of excavated earth within the bucket provides additional force on which the lever arms operate to keep the bucket closed during lifting.

The force of the weight of the bucket members and earth has been found to necessitate providing means on the upper edges of the bucket members to open the bucket. Such means are provided as tabs with apertures for attachment of cables which in turn may be attached to a pulling mechanism.

Overall, a shape and design has been provided which when combined with suitable rotating equipment, quickly excavates a neat hole for planting trees.

DETAILED DESCRIPTION OF THE PREFERRED EMBODIMENT

Figure 1:
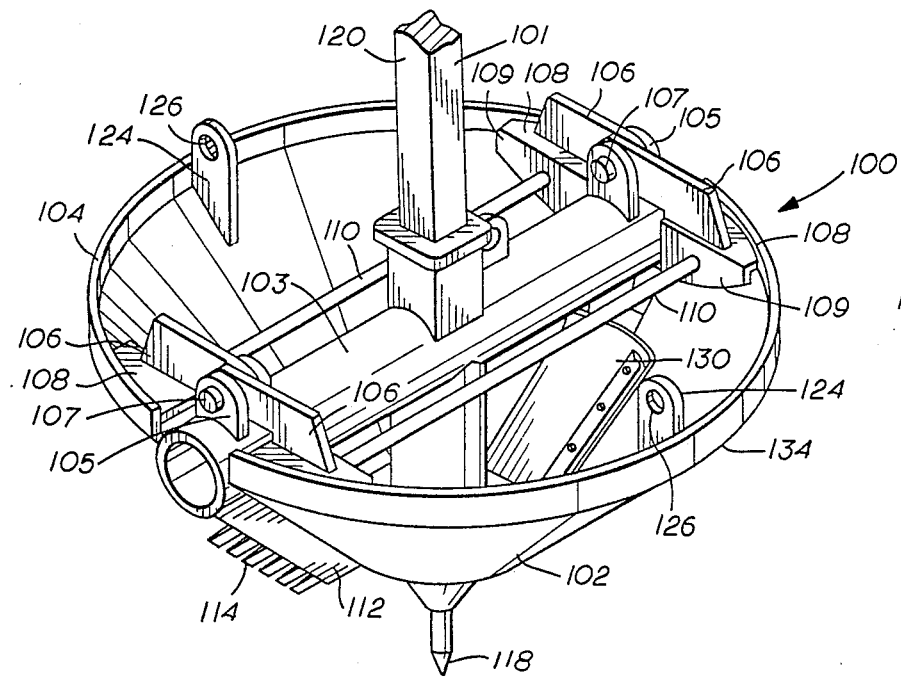
FIG. 1 is a top perspective view of one embodiment of the bucket auger of the present invention.

For a detailed description of the preferred embodiment the reader is directed to the accompanying figures in which like components are given like reference numerals.

In FIG. 1 a top perspective view of the preferred embodiment of the auger bucket 100 is shown. The auger bucket is shown to comprise a vertical central shaft 101 the top of which 120 is adapted to fit into a rotational drive mechanism (not shown). The lower end 122 of the central shaft 101 is tapered into a point 118 downward from tapered shoulder 132.

The vertical central shaft passes through and is secured to a top cross member 103 which consist of a sufficiently strong piece of pipe as 4 or 6 inch schedule 40. From either end of the cross member 103 side members 112 extend downward and inward, the side members being connected at the bottom with a bottom cross member 116 which is comprised of two members 116a and 116b which are welded to the lower ends of the side members 112 and to the lower end 122 of the central shaft. The top cross member 103, side members 112 and bottom cross member 116 thus form a trapezoidal frame with the top and bottom members being parallel and the two side members slanting inward at substantially the same angle.

Figure 2:
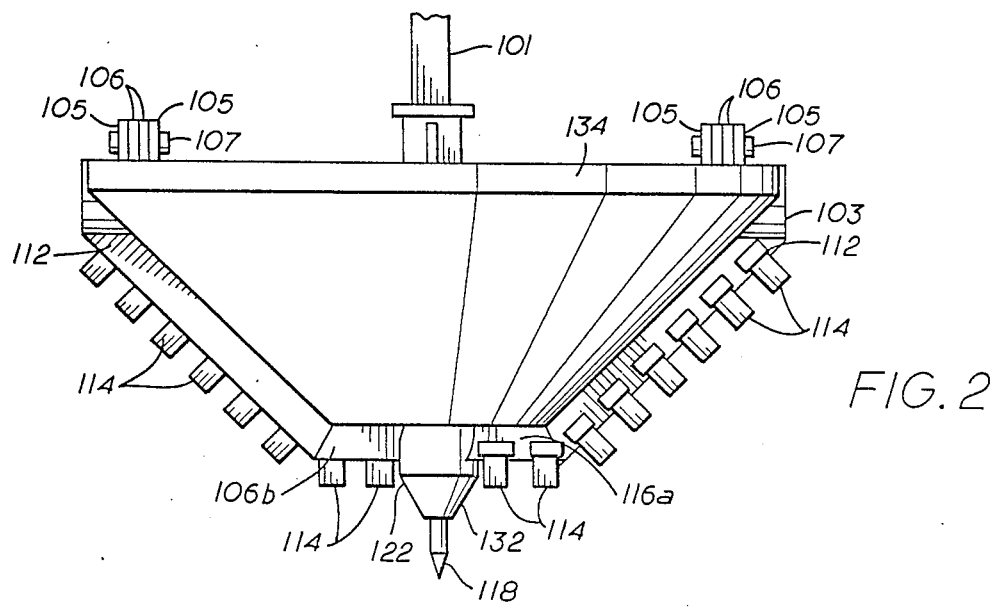
FIG. 2 is a side elevational view of the embodiment shown in FIG. 1.

The side members 112 and bottom members 116a and 116b all have teeth 114 extending from their surfaces downward and backward. That is, the teeth on one side and bottom member extend outward in one direction while the teeth on the opposite side and bottom member extend outward in the opposite direction to form an auger cutting edge on the frame when the auger is rotated in one direction. This can be more readily appreciated by reference to FIGS. 2-4.

Figure 3:
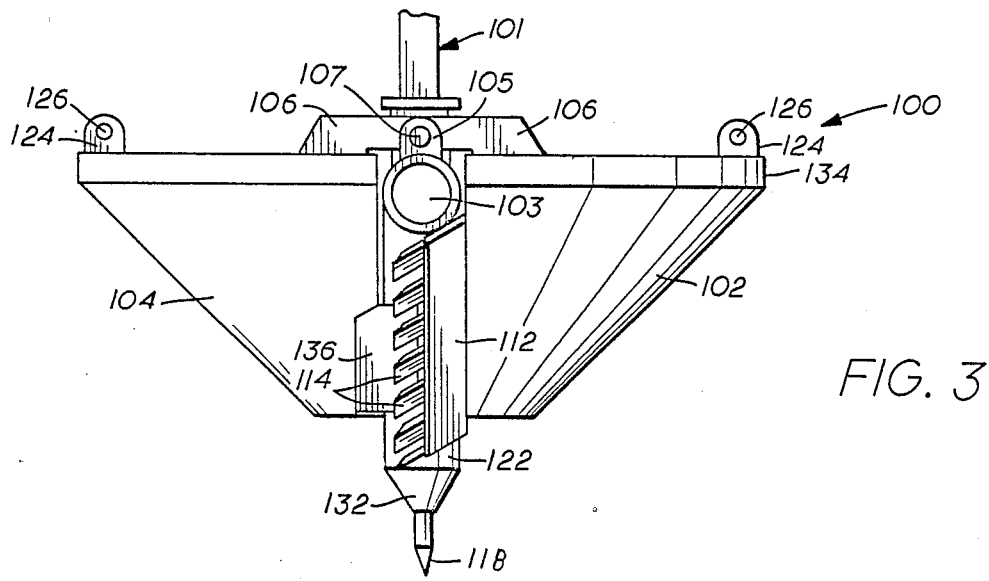
FIG. 3 is a side elevational view of the embodiment shown rotated 90° about the vertical axis.
Figure 4:
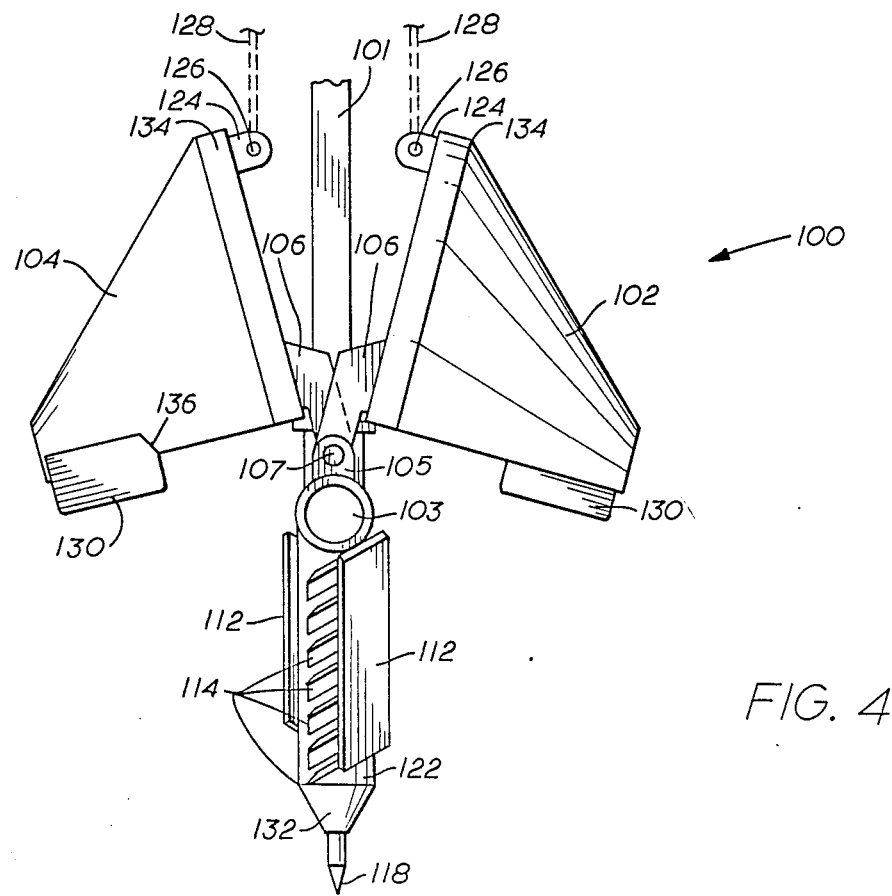
FIG. 4 is a side elevational view of the embodiment as shown in FIG. 3 with the bucket halves in the lifted position.

Referring again to FIG. 1, on either side of the top cross member the bucket members 102 are suspended. Each bucket member is in the form of a half frusto cone that tapers downward and inward to match the inner edge of side members 112 and the upper edge of bottom members 116a and 116b. Each bucket member 102 is shown to include a vertical lip 134 at its upper edge. Additionally each bucket member includes a horizontal partial chord flange 108 with a vertical face 109 near the top at either side. The bucket members are suspended from cross member 103 by arms 106 which are welded to the top surface of flanges 108 and extend between upright flanges 105 on cross member 103. A pin 107 passed through upright flanges 105 and arms 106 pivotally secure the bucket members 102 to cross member 103. Besides securing the bucket members 102 to the cross members the arms 106 provide a fulcrum which is combination with the weight of the bucket members keeps the bucket closed in operation. A flexible rubber flap 130 is provided on the inner surface of each bucket member to close slots 136 which as indicated in FIG. 3 and 4.

Rods 110 between surfaces 109 are provided for additional stiffening of the upper end of the bucket members.

Lifting flanges 124 having apertures 126 are provided on the top edge of the bucket member 102 opposite each other one half way around each bucket member. Cables may be attached to the flanges 124 through aperture 126 for opening the bucket members as shown in FIG. 4.

The separate cutting blades require the strength to be in the cross side and bottom member where force is applied. The bucket need be only of sufficient strength to contain the dirt, there being no force applied to their edges. This allows for a lighter and less expensive construction. Additionally individual teeth may be replaced or sharpened as needed with wear instead of the entire bucket or cutting edge.

In operation the bucket auger 100 is attached to a rotating mechanism through shaft 101 and lowered to the ground. As the auger bucket is rotated first tip 118 and then teeth 114 begin digging into the earth. Because of the spacing and slot 136 the earth is forced into the bucket members 102. When the cross member and the top of the bucket members 102 reach the ground level the bucket auger may be lifted out with the excavated dirt inside. Because of the weight of the bucket member and fulcrum from the arm 106, the weight of the dirt prevents the bucket members from separating. The flexible rubber flaps 130 which allow dirt into the bucket, also prevent it from escaping and the weight of the dirt on the flaps aids in holding the members together during lifting. No additional securing mechanism is required to prevent the bucket from opening. In fact, considerable force must be applied upward and inward on lifting flanges 124 to open the bucket members to the position shown in FIG. 4.

The size of the bucket auger should be selected to the size of the root ball on the tree being planted. Several sizes should be available as root ball sizes are fairly standard according to the size and type of tree.

The foregoing description has been directed to a particular preferred embodiment of the present invention for purposes of explanation and illustration. It will be apparent to those skilled in the art that many modifications and changes in the apparatus may be made without departing from the scope and spirit of the invention. It is, therefore intended that the following claims cover all equivalent modification and variation as fall within the scope of the invention as defined by the claims.

The invention claimed is:

1. A bucket auger useful for preparing excavations for planting trees, comprising in combination:
   (a) a cutting frame having cutting edges on either side and bottom;
   (b) a vertical shaft disposed through and secured to said frame, the upper end of said shaft being adapted for attachment to a rotational drive mechanism for rotating said shaft and said frame; and
   (c) bucket members disposed on either side of said frame to collect the earth excavated as said bucket auger is rotated.

2. The bucket auger of claim 1 wherein said cutting frame is substantially trapezoidal in shape and comprises:
   (a) a horizontal upper cross member;
   (b) side members secured to and extending downward and inward from said upper cross member at substantially the same angle;
   (c) a horizontal bottom cross member secured to and connecting said side members; and
   (d) cutting teeth secured to said side members and said bottom cross member.

3. The bucket auger of claim 2 wherein said cutting teeth are releasably secured to said side members and said bottom cross member.

4. The bucket auger of claim 2 wherein each of said bucket members are pivotally suspended from said upper cross member such that the lower ends and sides of said bucket members are forced together during operation of said bucket auger.

5. The bucket auger of claim 4 wherein said bucket members include slot means near the lower ends to facilitate entry of excavated earth as said bucket auger is rotated.

6. The bucket auger of claim 5 wherein each of said bucket members further comprise a flexible flap covering said slots to allow excavated earth to enter said bucket members during rotation of said bucket auger but prevent said excavated earth escaping when said bucket auger is lifted from the excavation.

7. The bucket auger of claim 4 wherein each of said bucket members is provided with attachment means for attaching a lifting means for forcing apart the lower ends and sides of said bucket members.

8. A bucket auger useful for preparing excavations for planting trees, comprising in combination:
   (a) a substantially trapezoidal cutting frame having upper and lower cross members connected on either end by side members, said side and bottom cross members having cutting teeth secured thereto;

(b) a vertical shaft disposed substantially through the middle of and secured to said upper and lower cross members, the upper end of said shaft being adapted for attachment to a rotational drive mechanism; and (c) bucket members pivotally suspended from said upper cross member such that the lower ends and sides of said bucket members are forced together during operation of said bucket auger.

9. The bucket auger of claim 8 wherein each of said bucket members is provided with slots near the lower ends to allow excavated earth to enter said bucket members while said bucket auger is rotated.

10. The bucket auger of claim 9 where each of said bucket members further comprise flexible flaps covering said slots such that excavated earth is allowed to enter said bucket members during rotation of said bucket auger but prevents said excavated earth from escaping when said bucket auger is lifted.

11. The bucket auger of claim 8 wherein each of said bucket members are provided with attachment means for attaching lifting means for forcing apart the lower ends and sides of said bucket members.

12. The bucket auger of claim 8 wherein each of said bucket members are pivotally suspended from said upper cross member by arm members fixedly attached to said bucket members and hingedly attached to said upper cross member, said arm members providing a lever arm to force the sides and lower ends together due to the weight of said bucket members.

13. The bucket auger of claim 8 wherein each of said bucket members are in the shape of one-half of a frusto cone which conforms to the inner edges of said cutting frame.

14. The bucket auger of claim 13 wherein each of said bucket members are open at the top and further comprise horizontal stiffening rods to prevent the top edges of said bucket members from collapsing during rotation.

15. The bucket auger of claim 8 wherein said cutting teeth are releasably secured to said side and bottom cross members.

16. The bucket auger of claim 8 wherein said teeth extend outwardly from said side and bottom members.

17. The bucket auger of claim 16 wherein said teeth extend outwardly from a first side member and its associated bottom member in a first direction and from a second side member and its associate bottom member in a second direction opposite to said first direction.

* * * * *